Aug. 18, 1953  J. C. BROOKS ET AL  2,648,904
MOTOR OPERATED CUTTER
Filed June 9, 1950  2 Sheets—Sheet 1
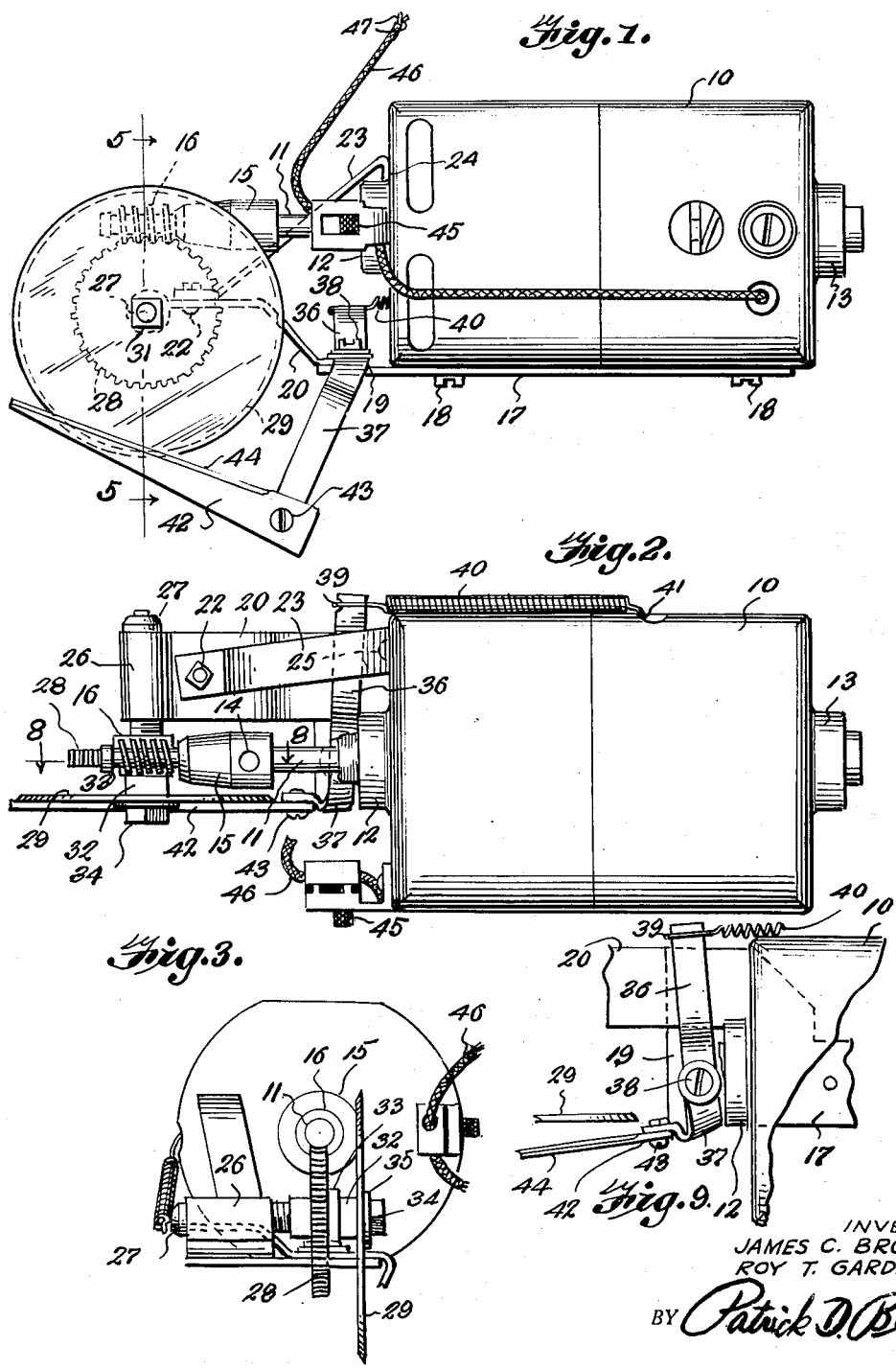
INVENTORS
JAMES C. BROOKS
ROY T. GARDNER
BY Patrick D. Beavers
ATTORNEY Aug. 18, 1953  J. C. BROOKS ET AL  2,648,904
MOTOR OPERATED CUTTER
Filed June 9, 1950  2 Sheets-Sheet 2
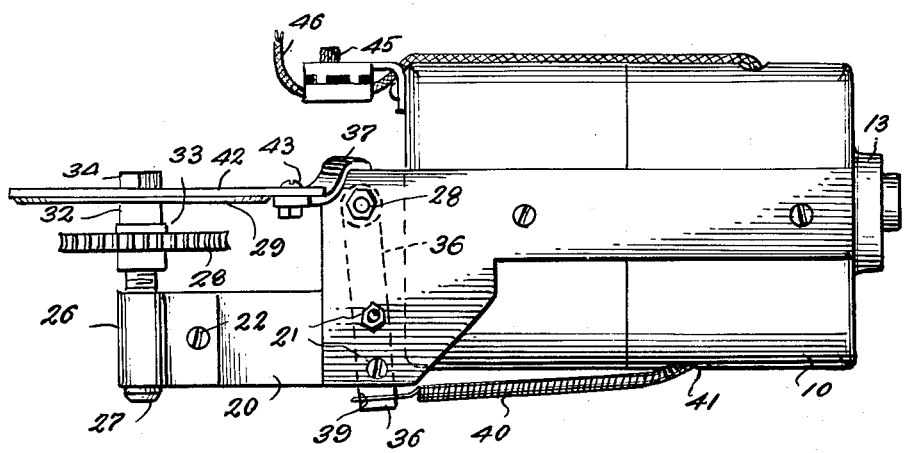
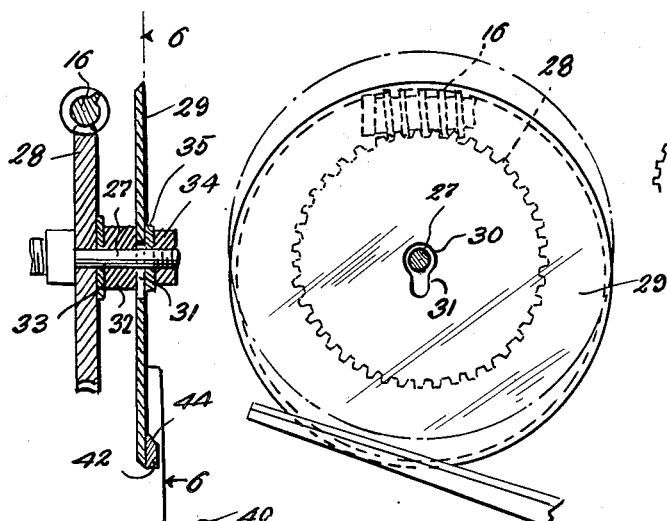
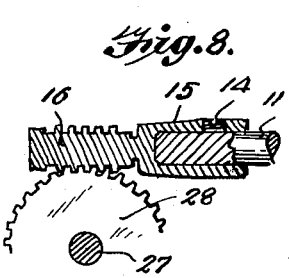
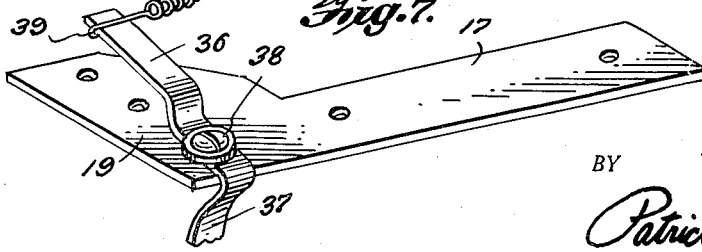
INVENTORS
JAMES C. BROOKS
ROY T. GARDNER
BY
Patrick D. Beavers
ATTORNEY Patented Aug. 18, 1953

2,648,904

UNITED STATES PATENT OFFICE 2,648,904

MOTOR OPERATED CUTTER

James C. Brooks and Roy T. Gardner,
Albertville, Ala.

Application June 9, 1950, Serial No. 167,007

2 Claims. (Cl. 30—264)

The present invention relates to motor operated cutter and it consists in the combinations, constructions and arrangements of parts herein described and claimed.

Generally the invention consists of a motor powered cutter which may be utilized for the cutting of paper, cloth, sheet metal and the like and is of such size as to be easily carried and manipulated by one hand of the operator using the device. A small electric motor is provided with a conventional casing and has affixed to its drive shaft a worm gear which is enmeshed with a worm wheel mounted upon a transversely extending shaft journaled in a bracket attached to the motor housing. The transverse shaft has affixed thereon at its inner end an eccentrically mounted circular blade. A cutting jaw having a straight-edged blade is held in tensioned contact with the circular blade by a novel arrangement of a bell crank lever pivoted to the bracket and provided with a tension spring interconnecting one of its arms and the motor housing.

It is accordingly an object of the invention to provide a device of the character set forth which is simple in construction, comparatively inexpensive to manufacture and yet effective and efficient in use.

Another object of the invention is the provision, in a device of the character set forth, of novel tensioning means for a cutting jaw forming a part of the invention.

Another object of the invention is the provision of a novel mounting for a circular blade likewise forming a part of the invention.

A still further object of the invention is the provision of a compact, portable, motor-operated cutter.

A still further object of the invention is the provision of a novel cutting action between a fixed and a movable blade which blades both form a part of the invention.

Other and further objects of the invention will become apparent from a reading of the following specification taken in conjunction with the drawings, in which:

Figure 1 is a side elevational view of an embodiment of the invention,

Figure 2 is a top plan view thereof,

Figure 3 is an end elevational view of the device shown in Figures 1 and 2,

Figure 4 is a bottom plan view of the device forming the present invention,

Figure 5 is an enlarged sectional view taken along line 5—5 of Figure 1,

Figure 6 is a sectional view taken along line 6—6 of Figure 5,

Figure 7 is a fragmentary perspective view of a bracket and bell crank lever forming a part of the invention, Figure 8 is an enlarged fragmentary sectional view taken along line 8—8 of Figure 2, and Figure 9 is a fragmentary top plan view, partly broken away, illustrating the action of a bell crank lever and associated parts forming a part of the invention.

Referring more particularly to the drawings, there is shown therein an electric motor having a cylindrical housing 10 and a centrally disposed drive shaft 11 which extends through conventional journals 12 and 13 and which has affixed thereon at its outer end by means of a set screw 14 a socket 15 which has integrally formed thereon an outwardly extending worm gear 16.

A longitudinally extending plate 17 is affixed to the underside of the housing 10 by means of screws 18 and is provided with an integrally formed forwardly extending portion 19 to which is affixed a bracket 20 by means of bolts 21 or the like. The bracket 20 has secured thereto by means of a bolt 22 or the like adjacent its outer end, a brace bar 23 whose inner end 24 is affixed to the housing 10 by means of a screw 25 or the like.

The outer end of the bracket 20 is bent to form a journal 26 for a transversely extending shaft 27 which has affixed thereon a worm wheel 28 which is enmeshed with the worm gear 16. The outer end of the shaft 27 has mounted eccentrically thereon a circular blade 29 which is provided with a central opening 30 having a key slot 31 extending radially therefrom.

A circular spacing member 32 and a washer 33 are interposed between the worm wheel 28 and the blade 29 and the latter is held upon the shaft 27 by means of a nut 34 threadably connected to the shaft 27 and having a washer 35 interposed between it and the blade 29.

A bell crank lever is provided with an inner arm 36 and an outer arm 37 and is pivotally mounted upon a bolt 38 carried by the extension 19. The arm 36 is provided with a notch 39 in its forward edge adjacent the outer end thereof and a tension spring 40 interconnects such notched portion of the arm 36 with one side of the motor housing 10, as indicated at 41.

A cutting jaw 42 is affixed by means of a bolt 43 or the like to the outer end of the arm 37 and is provided with a straight-edged cutting blade 44 which normally lies in contact with the circular blade 29. The blade 44 is beveled toward the blade 29 and the blade 29 is, in turn, beveled in the direction of the blade 44. The motor is provided with a finger operable switch 45 for controlling the same and with a conventional cord 46 containing wires 47 for operably attaching the same to an electrical outlet.

In operation, it will be apparent that when the motor is in motion, the shaft 11 and consequently the worm gear 16 will revolve and that such action, through the connection between the gears 16 and 28, will cause the revolution of the shaft 27 to thereby revolve the blade 29. It will also be seen that the action of the spring 40 through the arms 36 and 37 of the bell crank lever, will cause the straight-edged blade 44 to be at all times in tensioned contact with the movable blade 29. By loosening of the nut 34 the blade 29 may be eccentrically positioned upon the shaft 27 by moving such blade in a manner to receive the shaft 27 in the key slot 31 to any desired degree after which the nut 34 may again be tightened and it will be seen that the effective result of such adjustment is to give a combined reciprocatory action (as well as the circular motion) of the circular blade 29 with respect to the cutting jaw 42. Such pulsing movement acts to effectuate a more definite cutting action between the stationary and movable blades of the device. It will also be apparent that the material to be cut is engaged between the forward edges of the blades 44 and 29 and that the device may be grasped about the casing 10 and forcibly moved in a forward direction through the material to be cut.

While but one form of the invention has been shown and described herein, it will be readily apparent to those skilled in the art that many minor modifications may be made without departing from the spirit of the invention or the scope of the appended claims.

What is claimed is:

1. A cutter assembly comprising a housing, a plate affixed to the housing, a bracket extending from said plate, a drive shaft revolubly mounted in said bracket, a circular plate mounted upon said shaft, a bell crank lever mounted on said plate, a straight-edged blade carried by one end of said lever and contacting said circular blade, and means for urging said straight-edged blade toward said circular blade, said means including a spring interconnecting the outer end of said bell crank lever with said housing.

2. A cutter assembly comprising a housing, a plate affixed to the housing, a bracket extending from said plate, a drive shaft revolubly mounted in said bracket, a circular plate mounted upon said shaft, a bell crank lever mounted on said plate, a straight-edged blade carried by one end of said lever and contacting said circular blade, and means for urging said straight-edged blade toward said circular blade, said means including a spring interconnecting the outer end of said bell crank lever with said housing, said circular blade having a central opening and a radial slot extending from said opening for the selective positioning therein of said shaft whereby said circular blade may be centrally mounted and eccentrically mounted upon said shaft.

JAMES C. BROOKS.
ROY T. GARDNER.

References Cited in the file of this patent

UNITED STATES PATENTS

| Number | Name | Date |
|---|---|---|
| 425,102 | Kohn | Apr. 8, 1890 |
| 549,392 | Philippsohn | Nov. 5, 1895 |
| 1,508,505 | Bull | Sept. 16, 1924 |
| 1,581,265 | Holtzman | Apr. 20, 1926 |
| 1,796,463 | Kaltenbach et al. | Mar. 17, 1931 |
| 1,876,075 | Reichert et al. | Sept. 6, 1932 |
| 2,042,097 | Havanas | May 26, 1936 |
| 2,570,195 | Bird et al. | Oct. 9, 1951 |